April 13, 1965

E. H. SIKES 3,177,669

WIRE LAYING MACHINE

Filed May 15, 1961

INVENTOR.
Edwin H. Sikes
BY
*Hovey, Schmitt, Johnson & Hovey*
ATTORNEYS.

April 13, 1965     E. H. SIKES     3,177,669
WIRE LAYING MACHINE
Filed May 15, 1961     2 Sheets-Sheet 2
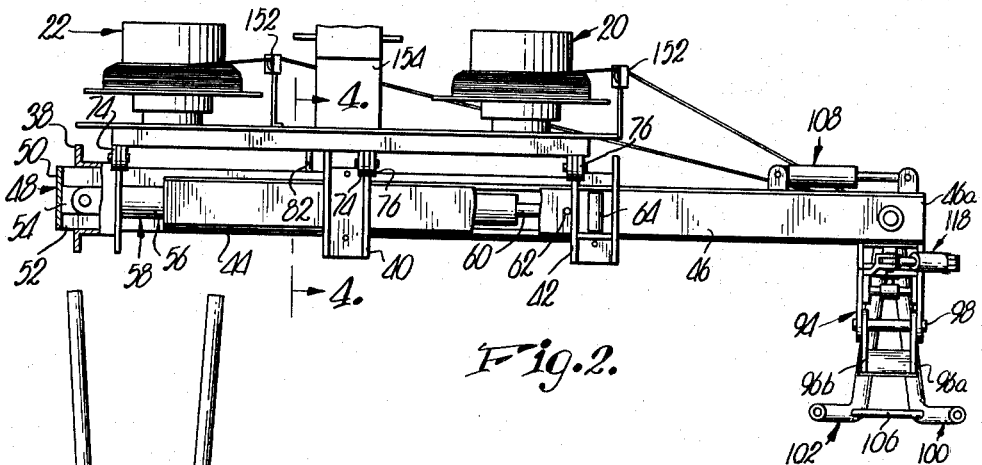
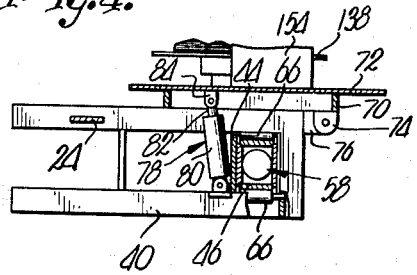
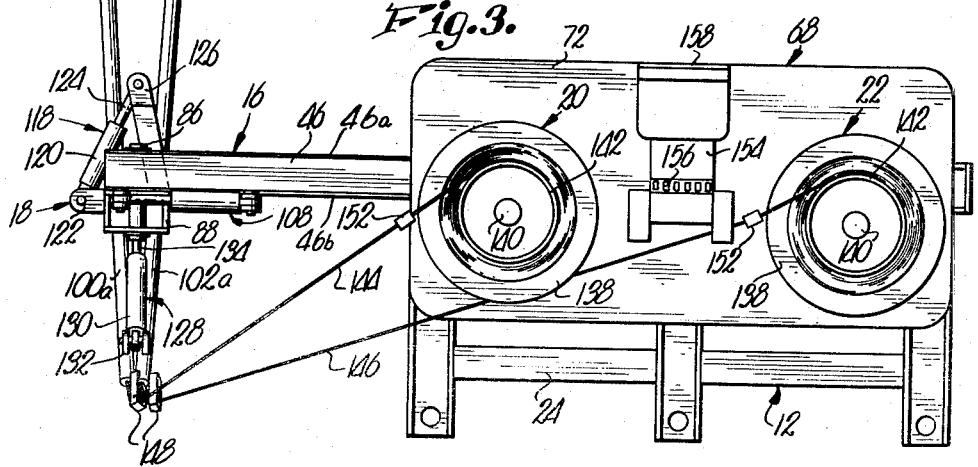
INVENTOR.
Edwin H. Sikes
BY
Hovey, Schmidt, Johnson & Hovey
ATTORNEYS.

United States Patent Office 3,177,669
Patented Apr. 13, 1965

3,177,669
WIRE LAYING MACHINE
Edwin H. Sikes, Gretna, La., assignor to H. C. Price Co., Bartlesville, Okla., a corporation of California
Filed May 15, 1961, Ser. No. 110,069
4 Claims. (Cl. 61—72.6)

This invention relates to apparatus for emplacing wire in a trench and particularly, to equipment for continuously laying wire within a trench in spaced relationship to the bottom and side walls of the ditch as dirt is filled thereinto.

It has been determined that at least partial protection from lightning and other electrical discharges may be given to coaxial cables buried in the ground by positioning one or more copper wires between the cable and the surface of the ground. Coaxial cables are normally emplaced in the ground by digging a continuous ditch, laying a cable along the bottom of the ditch and then backfilling the same in a substantially continuous operation wherein an additional length of the trench is being dug simultaneously with emplacement of the cable in a freshly prepared trench and with backfilling being carried out as soon as the cable is in proper disposition within the ditch. For maximum protection to the coaxial cable against electrical discharges such as lightning, it has been found that a pair of copper wires placed twenty-four inches apart and twenty-four inches above and parallel to the cable gives the best results. However, it is difficult to properly position the copper wires in spaced relationship from the coaxial cable which is located at the bottom of the trench, particularly when it is necessary to lay the cable in a substantially continuous operation wherein backfilling is being carried out along with digging of additional lengths of the trench and placement of the cable therein. The copper wire is subject to breakage if excessive tension is placed thereon as the dirt is filled into the trench, and it is also necessary that the dirt be properly compacted over the cable and around the wires in order to maintain the same in proper spaced disposition from the cable to be protected.

It is therefore the primary object of the present invention to provide apparatus for continuously laying wire within a trench along the length thereof and in spaced relationship to the bottom and side walls of the trench to provide protection for a coaxial cable or the like located at the bottom of the trench.

A further important object of the invention is to provide apparatus for laying wire which includes guide means adapted to slidably receive the wire in supporting relationship thereto and having structure thereon for protecting the wire from dirt as the trench is backfilled to thereby prevent breakage of the wire or forcing of the wire downwardly into closer relationship to the cable to be protected, than specified for a particular installation.

Another important object of the invention is to provide wire laying apparatus as described which is adapted to be mounted on a mobile vehicle that is movable alongside the ditch to permit continuous emplacement of the wire within the ditch at substantially the rate that the cable to be protected, is laid in the trench at the bottom thereof.

Also an important object of the invention is to provide wire laying apparatus wherein the guide means for slidably receiving the wire and in protecting relationship thereto, is swingably mounted on the mobile vehicle so that the elevation of the wire and the relationship of the latter with respect to the side walls of the trench, may be readily adjusted to compensate for differences in the terrain, variations in the depth of the trench, and immovable objects which may be left in the trench during digging thereof. In this respect, it is to be noted that a particularly important object of the invention is to provide apparatus wherein the wire receiving guide means is swingably mounted on a base unit carried by the mobile vehicle, and with the guide means being swingable about at least three axes to thereby allow the operator of the apparatus to quickly and easily adjust the disposition of the guide means as required so that the wire will be laid in preselected disposition with respect to the cable to be protected, regardless of the conditions encountered in the trench during laying of the wire. A further object is to provide apparatus wherein the wire guide means is shiftably mounted on the base unit carried by the mobile vehicle, for movement toward and away from the base unit whereby the location of the wires with respect to the side walls of the trench may be easily changed as required.

Another object of the invention is to provide wire laying apparatus as referred to above wherein the guide means slidably receiving the wire, is swingable about a plurality of axes and movable laterally of the trench during forward advancement of the mobile vehicle carrying the same, and from a position on the base unit of the apparatus whereby an operator may readily control laying of the wire at substantially the rate that the cable to be protected is emplaced in the trench.

Another very important object of the invention is to provide apparatus for laying wire wherein the wire is positioned in the trench in proper disposition without excessive tension being placed on the wire, tending to break the same, and with the wire being protected from the backfill dirt during pushing of the latter into the trench so that the wire will be accurately disposed with respect to the cable.

It is also an important object of the invention to provide wire laying apparatus which may be mounted on a number of different vehicles employed in cable laying operations and which does not in any way interfere with the normal operation of such machines.

Other important objects and details of construction of the present wire laying apparatus will become obvious or be explained in greater detail as the following specification progresses.

In the drawings:

FIG. 2 is a fragmentary, end elevational view of the apparatus shown in FIG. 1 with parts thereof being broken away and in section to reveal details of construction of the machine;

FIG. 3 is a plan view of the wire laying apparatus showing the same removed from the mobile vehicle;

FIG. 4 is a fragmentary, vertical, cross-sectional view taken substantially on the line 4—4 of FIG. 2 and looking in the direction of the arrows.

Figure 1:
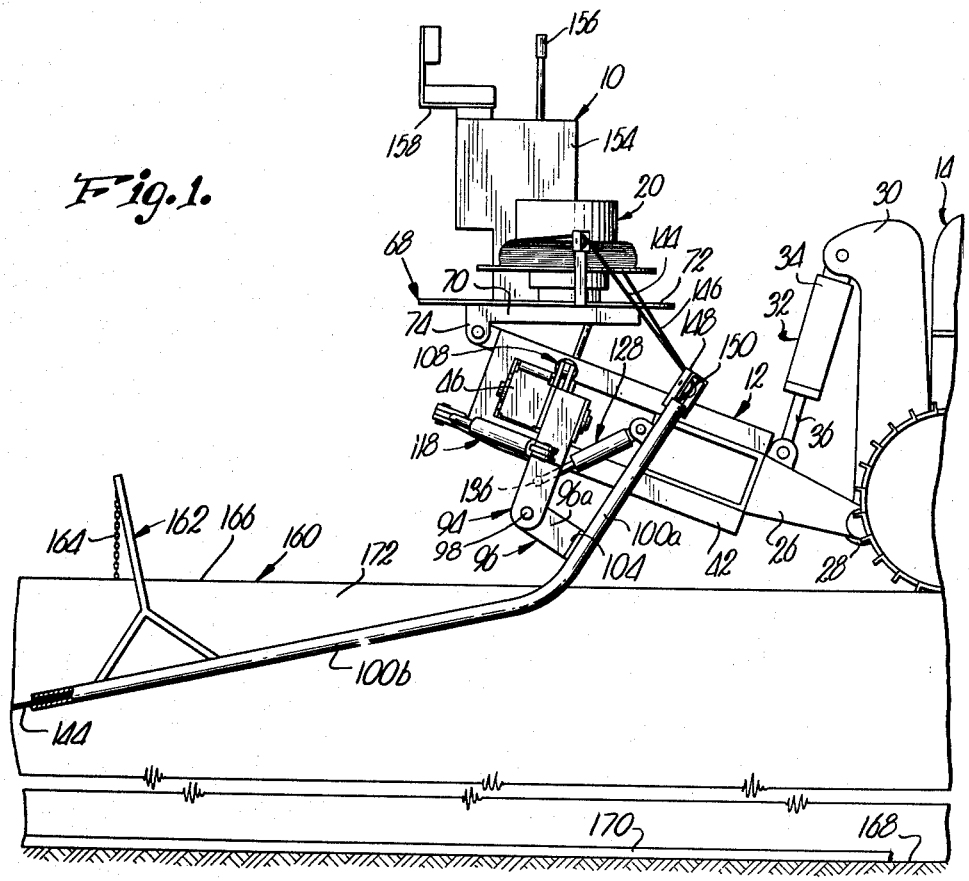
FIGURE 1 is a fragmentary, side elevational view of wire laying apparatus embodying the preferred concepts of the present invention and shown mounted in place on a suitable mobile vehicle movable alongside the trench in which the wire is to be laid.

Briefly, the present apparatus comprises a base unit adapted to be mounted on a mobile vehicle for movement therewith, and carrying a supply of wire to be laid, as well as guide means adapted to slidably receive the wire and emplace the latter in a trench in predetermined spaced relationship from the bottom and side walls of the ditch. The tubular guide for slidably receiving the wire is pivotal about three axes, and is also shiftable toward and away from the base unit carried by the vehicle, so that the disposition of the wire with respect to the cable at the bottom of the trench, may be readily controlled from a point on the base unit. It is preferred that the apparatus be capable of laying a pair of the wires in predetermined relative relationship with respect to each other and to the coaxial cable at the bottom of the trench.

Apparatus broadly designated 10 in the drawings includes a base unit 12 mounted on a suitable mobile vehicle 14, support means 16 shiftably carried by the base unit, wire guide and laying means 18 swingably carried by the support member at the outer extremity thereof, and a pair of wire supply units 20 and 22 on base unit 12.

As shown in FIGS. 1 and 3, base unit 12 includes a relatively heavy, elongated support member 24 normally disposed horizontally and having a pair of forwardly extending mounting segments 26 thereon which are adapted to be pivotally mounted to the drawbar 28 of vehicle 14. A pair of cylindrical mounting brackets 30 secured to the rear of vehicle 14 above drawbar 28, pivotally carry respective piston and cylinder assemblies 32 each having a cylinder 34 pivotally carried by brackets 30 adjacent the upper extremity thereof, as well as reciprocable pistons 36 pivotally joined to the upper faces of mounting segments 26.

Three generally U-shaped frames 38, 40 and 42 formed of channel members suitably interconnected as by welding or the like, are secured to member 24 in equidistantly spaced relationship, extend rearwardly therefrom as shown in FIG. 3, and are secured at the open ends thereof, to the upper and lower faces respectively of member 24. An upright elongated plate 44 carried by frames 40 and 42 adjacent the rearmost closed extremities thereof and spanning the distance therebetween, cooperates with frames 40 and 42 to define aligned rectangular openings for receiving a transversely square box member 46 of support means 16. A U-shaped mounting bracket 48 mounted on frame 38 adjacent the closed rear extremity thereof and having an upright outer wall segment 50 integral with opposed side walls 52 secured to frame 38 and associated braces thereon, has inwardly extending ears 54 pivotally receiving the cylinder 56 of an assembly 58 telescoped into box member 46. As illustrated in FIG. 2, the reciprocable piston 60 of assembly 58 is secured to box member 46 by a cross pin 62 carried by opposed side walls of member 46. In order to assure smooth movement of box member 46 with respect to plate 44, a pair of normally vertical rollers 64 are carried by frame 42 on opposite sides of box member 46 in engagement with the outer surfaces of the upright side walls thereof, while another pair of normally horizontal rollers 66 are mounted on frame 42 in positions to engage the upper and lower surfaces of box member 46 (see FIG. 4).

A platform generally designated 68 is swingably mounted on base unit 12 and includes a frame 70 carrying a normally horizontal, generally rectangular plate 72 with the downwardly projecting ears 74 on frame 70 being rotatably mounted on corresponding opposed ears 76 secured to each of the frames 38, 40 and 42, as illustrated in FIG. 2. A piston and cylinder assembly 78 is mounted on frame 40 adjacent plate 44 and includes a cylinder 80 pivotally joined to the lower portion of frame 40 as well as a piston 82 which is pivotally coupled to a lug 84 on the underface of plate 72.

An elongated pin 86 of relatively heavy stock and extending through the side walls 46a and 46b of box member 46, projects forwardly from side wall 46b, is rotatable with respect to box member 46 and carries a box bracket 88. A U-shaped bracket 90 (FIG. 5) is secured to the normal underside of bracket 88 and carries a central upright pin 92 which projects downwardly from the lower surface thereof and rotatably supports a U-shaped lower bracket 94 having a pair of parallel opposed legs 94a and 94b. Guide means 18 which is pivotally mounted on bracket 94 includes a U-shaped member 96 having a pair of opposed upright legs 96a and 96b which are received between legs 94a and 94b and are pivotally coupled thereto by cross pin 98. Guide means 18 is formed of a pair of substantially identical, elongated, longitudinally L-shaped tubes 100 and 102 which have relatively short upper portions 100a and 102a as well as generally rearwardly extending main portions 100b and 102b which diverge as the trailing extremities thereof are approached, as illustrated in FIG. 3. The tubes 100 and 102 are interconnected by the bight portion 104 of member 96 as well as by a spacer 106 located rearwardly of box member 46.

Figure 5:
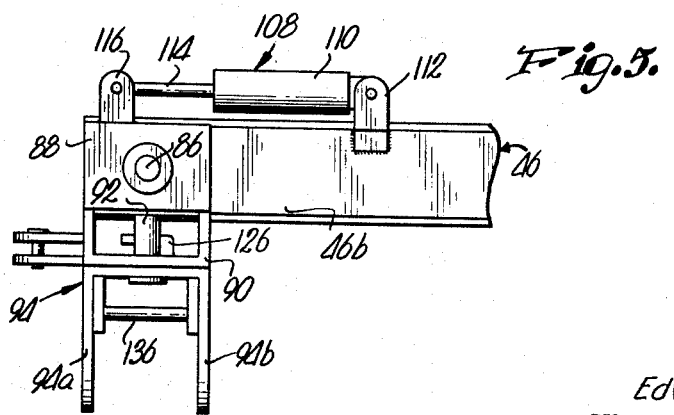
FIG. 5 is a fragmentary, enlarged view of the outermost portion of the support member serving to carry the wire guide means in spaced relationship from the mobile vehicle and with the guide means being removed therefrom.

Structure for rotating guide means 18 about the axis of pin 86 includes an assembly broadly designated 108 as best illustrated in FIG. 5, and including a cylinder 110 pivotally secured to a leg 112 projecting upwardly from side wall 46b of box member 46, in spaced relationship to box bracket 88, as well as piston 114 reciprocable in cylinder 110, and pivotally joined to a leg 116 projecting upwardly from box bracket 88. The guide means 18 is rotatable about pin 92 by virtue of assembly 118 carried by bracket 90 and including a cylinder 120 pivotally mounted on lug 122 projecting outwardly from bracket 90, as well as a piston 124 reciprocable in cylinder 120 and pivotally joined to an elongated link 126 secured to the bight portion of bracket 94 and projecting rearwardly therefrom, as illustrated in FIGS. 3 and 5. Power means for pivoting guide means 18 about the axis of pin 98 comprises an assembly 128 on the portions 100a and 102a of guide means 18 and including a cylinder 130 pivotally coupled to bifurcated bracket means 132 secured to and spanning the distance between tubes 100 and 102, as well as a piston 134 reciprocable in cylinder 130 and pivotally joined to a cross pin 136 carried between legs 94a and 94b.

The wire supply means 20 and 22 each include a reel 138 rotatable about an upright shaft 140 projecting upwardly from the top surface of plate 72 and having a central cylindrical section 142 adapted to have the wires 144 and 146 respectively coiled thereabout. As shown in FIGS. 1 and 3, U-brackets 148 respectively carried by the upper extremities of portions 100a and 102a of tubes 100 and 102, rotatably carry corresponding sheaves 150 adapted to receive the wires 144 and 146 thereover. The wire 144 is threaded through tube 100 while the wire 146 is passed through tube 102. Wire drags 152 carried by plate 72 adjacent reels 138 and receiving the wires 144 and 146 therein, permit placement of an adjustable amount of tension on the wires during paying out of the latter.

A support frame 154 mounted on the upper surfaces of plate 72 between reels 138 and adjacent the rearmost margin of plate 72, carries manually operable hydraulic control structure including a number of swingable levers 156 which control passage of fluid from the hydraulic system of vehicle 14, to the various piston and cylinder assemblies previously described. An operator's seat 158 on frame 154 permits the workman to be seated while controlling the disposition of guide means 18 within the trench 160. A generally L-shaped frame 162 carried by and extending upwardly from tube 102 adjacent spacer 106, has a laterally extending upper arm segment 162a serving as means for carrying a height indicator chain 164 adapted to drag along the surface 166 of the ground during forward advancement of vehicle 14 and thereby indicating the disposition of the trailing extremities of tubes 100 and 102 with respect to the bottom 168 of trench 160.

In operation, apparatus 10 is coupled to the drawbar 28 of vehicle 14 and hydraulic fluid is directed into assemblies 32 to raise base unit 12 to a predetermined height above the ground. Next, the vehicle 14 is moved alongside ditch 160 in which one or more coaxial cables 170 have been placed and in contact with the bottom 168 of such trench. The operator on seat 158 shifts one of the levers 156 in a direction to cause hydraulic fluid to enter assembly 58 in a direction to shift box member 46 laterally relative to base unit 12 sufficiently to locate guide means 18 in equal spaced relationship from the side walls 172 of ditch 160. It can be seen that retraction of piston 60 into cylinder 56 shifts box member 46 and thereby guide means 18 toward the side wall 172 of the ditch 160 proximal to vehicle 14, while extension of piston 160 moves guide means 18 in the opposite direction.

Next, one of the levers 156 is moved to cause hydraulic fluid to flow into assembly 128 in a direction to extend or retract the piston 134 thereof and thereby pivot tubes 100 and 102 about the axis of pin 98 to an extent to move the trailing extremities of tubes 100 and 102 into predetermined spaced relationship from the bottom 168 of trench 160. As indicated previously, it is preferred that the trailing extremities of tubes 100 and 102 be located approximately 24 inches apart and that such extremities also be positioned about two feet above coaxial cable 170.

The operator also may direct hydraulic fluid into assembly 78 to pivot plate 72 with respect to base unit 12 and thereby maintain platform 68 in a horizontal position, regardless of the angularity of base unit 12 with respect to the horizontal.

The wires 144 and 146 may now be continuously laid in trench 160 by causing vehicle 14 to move forwardly along trench 160 and with the terminal extremities of the wires 144 and 146 initially being held in proper disposition as the vehicle 14 commences to move. As dirt is backfilled into the trench 160, such dirt falls downwardly over the tubes 100 and 102 and covers the cable 170 as well as the rear portions of the tubes 100 and 102. The wires 144 and 146 are protected by the portions 100b and 102b of tubes 100 and 102 and therefore the portions 100b and 102b maintain the wires 144 and 146 payed out of tubes 100 and 102, in predetermined spaced relationship from cable 170 and also prevent severing or displacement of the wires as the same are buried in the dirt returned to trench 160. As soon as the dirt has covered a short length of the wires 144 and 146 emplaced in trench 160, the tubes 100 and 102 serve to automatically maintain such wires in predetermined relationship with respect to cable 170 as the vehicle 14 continuously moves forward alongside the uncovered portion of trench 160 having cable 170 on the bottom thereof.

The operator may visually observe the disposition of guide means 18 with respect to trench 160 and may adjust the location of tubes 100 and 102 as required to compensate for irregularities in the surface 166 of the ground, the bottom 168 of trench 160, or the side walls 172 thereof. Direction of fluid into assembly 118 rotates guide means 18 about the axis of pin 92 to thereby vary the disposition of the trailing extremities of tubes 100 and 102 relative to side walls 172 of trench 160, while introduction of hydraulic fluid into assembly 108 rotates guide means 18 about pin 86 to thereby tilt the tubes 100 and 102 to one side or the other as required to maintain the extremities thereof in equal spaced relationship from all parts of the bottom 168 of trench 160. The box member 46 may also be shifted in and out as required during movement of vehicle 14, and the operator may maintain the platform 68 on base unit 12 substantially horizontal regardless of the angularity of the longitudinal axis of vehicle 14 with respect to the horizontal.

The chain 164 carried by frame 162 aids the operator in determining the exact disposition of the trailing extremities of tubes 100 and 102 with respect to bottom 168 of trench 160, since the rear portions of tubes 100 and 102 are normally covered with dirt during the backfilling operation which is carried out simultaneously with forward advancement of vehicle 14.

It can now be seen that the guide means 18 is rotatable about a plurality of axes to permit maintenance of the wires 144 and 146 in correct disposition with respect to cable 170 and regardless of the motion of vehicle 14 as the same moves over irregular objects such as stones or the like, or is forced to ascend or descend relatively steep inclines. Additionally, the guide means 18 may be swung about a vertical axis to permit the tube 100 and 102 to follow a serpentine path described by trench 160 and thereby around relatively sharp bends if required. The shiftable box member 46 carrying guide means 18 is an important feature of the present machine because the tubes 100 and 102 may be kept in proper disposition with respect to cable 170 even when it is necessary for the vehicle 14 to move away from trench 160 to avoid obstacles adjacent the margin thereof, or when the ditch is relatively wide in certain areas. This is one of the most critical controls in laying the wire in ditch 160 because the vehicle 14 necessarily follows an irregular path alongside ditch 160.

Experienced operators, because of the inherent flexibility of apparatus 10, can accurately place wires in ditch 160 at speeds in excess of two hundred feet per minute. Thus, the cost of placing protective wires in a ditch above a coaxial cable or the like, is rendered much less expensive than in prior operations and with proper placement of the wires being assured.

Having thus described the invention what is claimed as new and desired to be secured by Letters Patent is:

1. Apparatus for continuously laying wire within a trench along the length thereof and in spaced relationship to the bottom and side walls of the trench, said apparatus including:
   a mobile base unit adapted for forward movement along a path of travel extending alongside said trench;
   a support member carried by the base unit and extending laterally therefrom;
   a tubular, elongated guide adapted to slidably receive the wire therewithin in supporting relationship thereto;
   means mounting said guide on said member with the guide extending downwardy and rearwardly therefrom for movement of the guide about an upright axis and about a generally horizontal axis extending transversely of said path of travel; and
   means coupled with said guide for selectively shifting the latter about said axes to a desired operational disposition whereby, upon forward movement of the base unit along said path of travel, the wire may be positioned at a selected depth within the trench and in proper spaced relationship to the side walls thereof.

2. The invention of claim 1, wherein said mounting means includes structure mounting said guide on said member for movement of the guide about a generally horizontal axis extending parallel to said path of travel, said selective shifting means being operable to shift said guide about said last-mentioned axis.

3. The invention of claim 1, wherein said base unit includes means supporting said member for reciprocal movement of the latter transversely of said path of travel, and wherein is provided power means coupled with said member for shifting the latter.

4. The invention of claim 1, wherein said base unit includes frame structure, a platform, means mounting the platform on said frame structure for movement of the platform about a normally horizontal axis extending transversely of said path of travel, an operator's seat on the platform, and means coupled with said platform for shifting the latter to maintain the platform in a substantially horizontal disposition during movement of the base unit over upgrades and downgrades, whereby to maintain the operator's seat level.

References Cited by the Examiner
UNITED STATES PATENTS

| | | | |
|---|---|---|---|
| 781,568 | 1/05 | Stevens | 61—72.6 |
| 882,649 | 3/08 | Noble | 61—72.6 |
| 1,194,460 | 8/16 | Yocum. | |
| 1,913,670 | 6/33 | Hindes | 37—67 |
| 2,572,910 | 10/51 | Brown. | |
| 2,663,515 | 12/53 | Kinsinger | 61—72.6 |
| 2,874,789 | 2/59 | Hershman | 116—124 |
| 2,903,949 | 9/59 | Simmonds | 94—49 |

BENJAMIN BENDETT, *Primary Examiner.*

HENRY C. SUTHERLAND, JACOB L. NACKENOFF,
*Examiners.*